(No Model.)

S. D. NESMITH.
UNDERGROUND SYSTEM FOR ELECTRIC RAILWAYS.

No. 462,153. Patented Oct. 27, 1891.

Witness,
E. Jay Pinney.

Inventor,
Samuel D. Nesmith.
Att'y. Geo. W. Tibbitts.

UNITED STATES PATENT OFFICE.

SAMUEL D. NESMITH, OF CLEVELAND, OHIO.

UNDERGROUND SYSTEM FOR ELECTRIC RAILWAYS.

SPECIFICATION forming part of Letters Patent No. 462,153, dated October 27, 1891.

Application filed August 4, 1890. Renewed August 29, 1891. Serial No. 404,086. (No model.)

*To all whom it may concern:*

Be it known that I, SAMUEL D. NESMITH, a citizen of the United States, residing at Cleveland, in the county of Cuyahoga and State of Ohio, have invented certain new and useful Improvements in Underground Trolley System for Electrical Railways, of which the following is a specification.

This invention relates to the trolley system of electrical railways, and has for its object to utilize underground conduits for such system; and it consists in providing an electric conductor, in combination with a conduit supported therein, with a protection-plate in such a manner that a trolley-wheel may ride on said conductor beneath said protection-plate and conduct an electric current upward to a motor on a car, substantially as hereinafter described, and pointed out in the claims.

Figure 2:
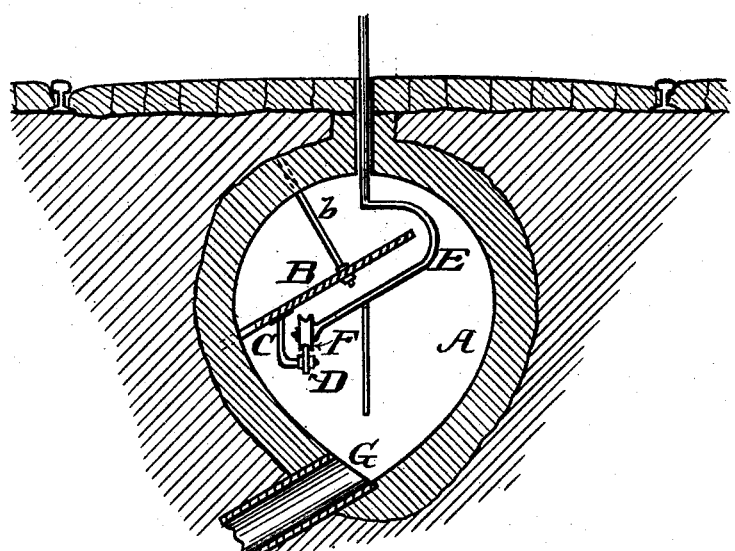
Figure 1:
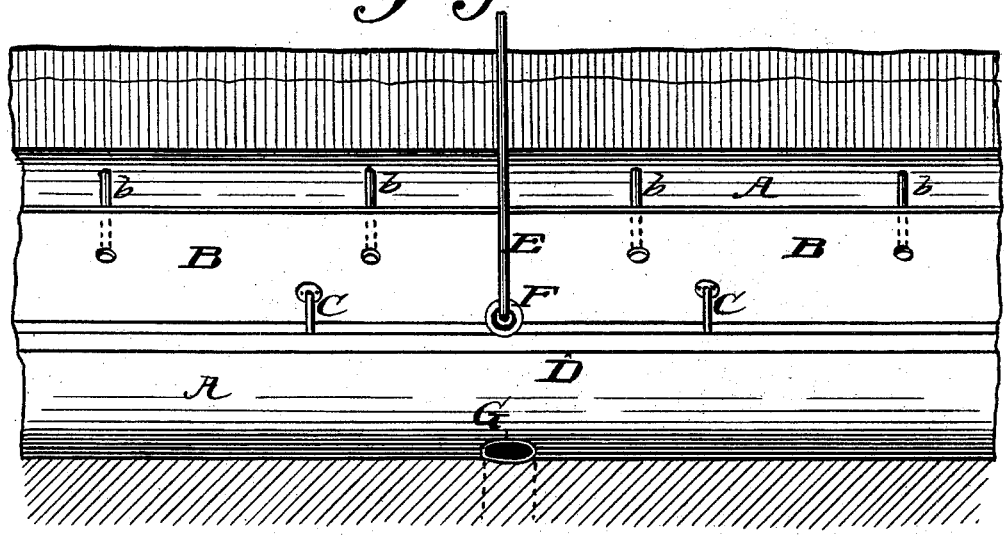

In the accompanying drawings, Figure 1 is a longitudinal section of a conduit having the said protection supporting-plate, conductor, and trolley arranged in working order therein. Fig. 2 is a cross-section of the same.

A represents a conduit beneath and parallel with a railway road-bed. This may be made of any suitable material, preferably of concrete. Cable-road conduits may be utilized for the purpose.

B is a metal plate extending longitudinally in said conduit and is fixed diagonally in cross-section, as seen in Fig. 2, having its lower side secured to the side of the conduit about midway of its height by suitable means, such as anchor-bolts, leaving about an inch space between the side of the conduit and the edge of said plate for drainage. A space of about four inches is left between the upper edge of said plate and the opposite side of the conduit. The plate is also supported in the diagonal position by means of anchor-rods $b\ b$.

To the under side of the plate B are attached hanging brackets C C, which support and carry an electric conductor bar or rod D, which is suitably insulated and isolated from said plate and conduit, extending lengthwise therein and parallel with said plate B.

E is a trolley-arm reaching down through the roadway-slot into the conduit, and is bent or curved so as to pass round the upper edge of plate B, and extends diagonally beneath it, and is provided on its lower end with a trolley-wheel F, which rides upon the aforesaid conducting bar or rod D. The trolley E is employed for conducting the electric current to a motor on a car. (Not shown.) A return-current wire may be arranged along the railway-track in the usual manner or in any other convenient manner. At suitable intervals along the bottom of the conduit are provided sluiceways G, leading into a sewer for drainage. To the trolley-arm E is provided a depending branch arm, to which a brush may be attached when required for the purpose of sweeping the bottom of the conduit. Man-holes are also to be provided at suitable intervals for the purpose of giving access to the conduit for inspection or repairs, &c.

Crossings, curves, and switches may be arranged for this system very easily. For crossings a slot made crosswise through plate B in the track of a transverse or diagonal roadway is all that would be required for the passage of a trolley-arm. It will be seen that for curves the plate B could be curved in conformity with change of direction in a roadway.

Having described my invention, what I claim is—

1. The combination, with conduit A, of the plate B, supported therein in slanting position by rods $b$ or equivalent means and provided with electric conductor D, suspended by suitably-insulated hangers C, substantially as described.

2. The combination, with conduit A, of plate B, supported in said conduit in a slanting position by means substantially as described, and provided with an electric conductor D, suspended by suitably-insulated hangers C, and a trolley-arm E, with wheel riding on said conductor, substantially as described.

3. In an electric railway, the combination of a conduit having sluiceway drainage, a longitudinal plate arranged diagonally within said conduit, an electric conductor supported beneath said plate, and a trolley-arm adapted to slide on said conductor and provided with a branch arm, substantially as and for the purpose specified.

SAMUEL D. NESMITH.

Witnesses:
GEO. W. TIBBITTS,
E. JAY PINNEY.